United States Patent
Buttner et al.

(10) Patent No.: US 10,167,631 B2
(45) Date of Patent: Jan. 1, 2019

(54) THERMAL INSULATION PANEL

(71) Applicant: Interbran Systems AG, Eggenstein-Leopldshafen (DE)

(72) Inventors: Siegmar Buttner, Viernheim (DE); Kurt Schumchen, Dahlem (DE)

(73) Assignee: Interbran Systems AG, Eggenstein-Leopoldshafen (DE)

( * ) Notice: Subject to any disclaimer, the term of this patent is extended or adjusted under 35 U.S.C. 154(b) by 246 days.

(21) Appl. No.: 15/106,715

(22) PCT Filed: Dec. 22, 2014

(86) PCT No.: PCT/EP2014/003461
§ 371 (c)(1),
(2) Date: Sep. 22, 2016

(87) PCT Pub. No.: WO2015/090616
PCT Pub. Date: Jun. 25, 2015

(65) Prior Publication Data
US 2017/0022703 A1    Jan. 26, 2017

(30) Foreign Application Priority Data

Dec. 20, 2013 (DE) .................. 10 2013 021 703
Jan. 29, 2014 (DE) .................. 10 2014 101 056
Feb. 12, 2014 (DE) .................. 10 2014 101 707

(51) Int. Cl.
| | | |
|---|---|---|
| *E04B 1/80* | (2006.01) | |
| *B32B 3/12* | (2006.01) | |
| *B32B 5/02* | (2006.01) | |
| *B32B 5/18* | (2006.01) | |
| *B32B 7/14* | (2006.01) | |
| *E04C 2/288* | (2006.01) | |
| *E04C 2/34* | (2006.01) | |
| *E04C 2/36* | (2006.01) | |
| *E04B 2/00* | (2006.01) | |
| *E04B 1/74* | (2006.01) | |

(52) U.S. Cl.
CPC ............ *E04B 1/806* (2013.01); *B32B 3/12* (2013.01); *B32B 5/028* (2013.01); *B32B 5/18* (2013.01); *B32B 7/14* (2013.01); *E04B 1/80* (2013.01); *E04C 2/2885* (2013.01); *E04C 2/3405* (2013.01); *E04C 2/365* (2013.01); *E04C 2/46* (2013.01); *B32B 2255/26* (2013.01); *B32B 2260/021* (2013.01); *B32B 2260/044* (2013.01); *B32B 2262/101* (2013.01); *B32B 2266/057* (2016.11); *B32B 2266/126* (2016.11); *B32B 2307/304* (2013.01); *B32B 2607/00* (2013.01); *E04B 2001/748* (2013.01); *Y02A 30/243* (2018.01); *Y02B 80/14* (2013.01)

(58) Field of Classification Search
CPC .. B32B 5/18; B32B 3/12; B32B 5/028; E04C 2/2885; E04C 2/3405; E04C 2/365; E04C 2/46; E04B 1/806; E04B 1/80
See application file for complete search history.

(56) References Cited

FOREIGN PATENT DOCUMENTS

EP        2402150 A1 *  1/2012  ............. B32B 5/02

* cited by examiner

*Primary Examiner* — John E Uselding
(74) *Attorney, Agent, or Firm* — Edward E. Sowers; Brannon Sowers & Cracraft PC (57) ABSTRACT

A thermal insulation panel is provided for thermally insulating edifices. The thermal insulation panel contains at least one aerogel and is open to diffusion along the panel's main insulating direction.

6 Claims, 1 Drawing Sheet

THERMAL INSULATION PANEL

CROSS-REFERENCES TO RELATED APPLICATIONS

This application is a National Stage filing of International Application PCT/EP 2014/003461, filed Dec. 22, 2014, entitled THERMAL INSULATION PANEL, claiming priority to German Application Nos. DE 10 2013 021 703.2 filed Dec. 20, 2013, DE 10 2014 101 056.6 filed Jan. 29, 2014, and DE 10 2014 101 707.2 filed Feb. 12, 2014. The subject application claims priority to PCT/EP 2014/003461, to DE 10 2013 021 703.2, to DE 10 2014 101 056.6, and to DE 10 2014 101 707.2 and incorporates all by reference herein, in their entirety.

BACKGROUND OF THE INVENTION

The present invention relates to the technical field of heat insulation, in particular the thermal insulation of buildings.

In particular the present invention relates to a thermal insulation panel, in particular for application to a building wall.

Furthermore, the present invention relates to a composite thermal insulation system (CTIS), which has a thermal insulation panel as well as an insulation plaster system.

Whereas until the 1980s in the new building and acquisition of real estate the thermal insulation of buildings was regarded as a low priority, this is increasingly gaining in importance due to rising energy prices, a heightened environmental awareness and not least due to legislative measures, such as for example the German Energy Saving Regulations (EnEV).

The insulation of new and old buildings takes place predominantly through so-called external insulation, i.e. the outsides of the building are provided with insulating materials.

Usually composite thermal insulation systems (CTIS), which are made up of an insulation material in panel form, a reinforcing layer applied externally thereto and consisting of a reinforcing mortar as well as a reinforcing fabric and a final coat, are preferably used for the thermal insulation. The insulation panels are usually based on plastics, in particular polystyrene hard foams (PS), such as for example polystyrene particle foam (EPS) or polystyrene extruded foam (XPS), or based on polyurethane hard foams (PUR). Thermal composite systems on the basis of the aforementioned plastic insulation panels have outstanding insulation properties under ideal conditions, but have the disadvantage that they form a vapor barrier and moisture from the masonry wall cannot be given off to the environment, which often leads to the formation of molds and algae. Furthermore the moisture increases the thermal conductivity of the system, and for this reason the theoretical heat transition coefficients (U values) according to EN ISO 6946 are often not achieved in practice.

Furthermore have composite thermal insulation systems (CTIS) have thicknesses from 15 to 20 cm, in order to achieve sufficient thermal insulation, which often leads to a visual deterioration of the insulated facade and a reduced incidence of light into the interior of the building through the window. For reduction of the thickness of the thermal composite systems (CTIS), recently so-called vacuum insulation panels (VIP) are increasingly being used which allow effective thermal insulation with composite thermal insulation systems having a thickness of approximately 10 cm. However, these composite thermal insulation systems also have the crucial disadvantage that they are not open to diffusion, i.e. moisture content from the masonry wall cannot be given off to the environment.

On the other hand the alternatively employed insulating materials which are open to diffusion, for example on the basis of mineral wool or natural organic fibers, such as wood, cork, hemp and reed fibers, often lack the necessary mechanical stability and structural integrity; instead these systems are flexible and not are dimensionally stable. Furthermore, these systems have a substantially lower insulating effect by comparison with plastic panels or vacuum insulation panels.

A common feature of all the composite thermal insulation systems which are based on organic polymers or contain organic natural substances is that they are combustible and in order to reduce the combustibility or flammability in general they have to be treated with special chemicals, which however in turn is often accompanied by increased environmental pollution and health risks.

Furthermore insulation plasters, which contain a binding agent as well as heat insulating additives, are also employed. As a rule such insulation plasters are open to diffusion, i.e. moisture from the masonry wall can be given off to the environment, but the insulating effect as well as the mechanical load-bearing capacity of such insulation plasters are substantially reduced by comparison with composite thermal insulation systems, which limits the use of thermal insulation plasters to a few applications.

Therefore in the prior art there has been no lack of attempts to improve the available insulation systems for thermal insulation of buildings:

Thus for example DE 10 2012 101 931 A1 relates to a facade insulation system with a sub-structure of timber frame construction, an insulation layer formed of mineral wool panels and a plaster layer, wherein on the insulation layer a support fabric exists which should give the insulation an increased mechanical load-bearing capacity.

Furthermore DE 10 2010 029 513 A1 relates to a thermal insulation powder mixture, which is processed to produce thermal insulation moldings and consists of a mixture of silicic acid and at least one fiber material.

DE 10 2011 109 661 A1 relates to an insulation material panel as well as a special arrangement of a plurality of insulation material panels on a building wall, which are connected by means of an adhesive having a capillary action for regulating moisture content.

Whilst the aforementioned systems can improve individual aspects of the conventional thermal insulation systems at least at certain points, they do not, however, enable the elimination of the basic disadvantages of the conventional thermal insulation systems Furthermore attempts are made to improve the efficiency of thermal insulation systems by the use of special materials. In particular attempts are made to work aerogels into insulating materials or thermal material systems, in order to increase the insulating effect thereof. Aerogels are highly porous solid bodies, of which more than 90 vol.-% consist of pores. Due to the extremely high porosity aerogels are at least theoretically suitable in an outstanding manner for thermal insulation and have thermal conductivity values A in the range from 0.012 to 0.020 W/(mK). The aerogels usually used for insulation purposes consist of silicon dioxide or condensed silicic acid and are obtained from silicates by sol-gel processes. Furthermore, in addition to the good thermal insulation properties, aerogels are characterized by good sound insulation as well as non-combustibility. However, due to the high porosity aerogels have only an extremely low mechanical stability and are destroyed even at low mechanical loads.

On account of the good thermal insulation properties of, in particular, silicate-based aerogels, numerous attempts have nevertheless been made to integrate aerogels into insulating materials. Aerogels are incorporated inter alia into insulation panels made of rock wool; a corresponding product is commercially available under the trade name Aerowolle®.

Furthermore, attempts have also been made to integrate aerogels into insulation plasters, wherein however especially the mechanical workability, in particular the application of the insulation plaster by means of plastering machines, has proved difficult, since the fragile aerogel particles are usually destroyed during the application under pressure to the building wall.

DE 10 2011 119 029 A1 relates to an insulation material for producing an insulation element, wherein the insulation material contains aerogel particles and at least one inorganic or organic binding agent. The proportion of binding agent should be less than 3% by volume in relation to the total volume of the insulation material, and the insulation material also contains expanded or extruded styrene polymerizate particles.

However, also with the aforementioned systems it has not been possible hitherto to make significant improvements to the fundamental disadvantages of the use of aerogels, namely the lower mechanical load-bearing capacity and the resulting reduced durability as well as the insulating effect of the insulating materials which is substantially reduced in practice.

BRIEF SUMMARY OF THE INVENTION

Therefore the object of the present invention is to make thermal insulation material systems available, wherein the previously described problems and disadvantages occurring in connection with the prior art should be at least largely avoided or at least alleviated.

In particular it is an object of the present invention to provide a thermal insulation panel which is open to diffusion, has a small thickness and outstanding thermal insulation properties.

Moreover, it is a further object of the present invention to provide thermal insulation systems, in particular composite thermal insulation systems, which are open to diffusion, have a substantially reduced thickness by comparison with previous systems and at the same time have improved thermal insulation properties.

The previously described object is achieved according to the invention by a thermal insulation panel as described herein; further advantageous modifications and embodiments of the thermal insulation panel according to the invention are similarly discussed.

A further subject of the present invention is a composite thermal insulation system, having a thermal insulation panel as well as an insulation plaster system; further advantageous modifications and embodiments of this aspect of the invention are similarly provided.

It is self-evident that, where details of values, figures and ranges are given below, the relevant values, figures and ranges given should not be understood as limiting; on the contrary, for the person skilled in the art it is self-evident that it is possible to deviate from the given ranges or details on the basis of the individual case or application without departing from the scope of the present invention.

Moreover, it is the case that all value or parameter details or the like given below can in principle be ascertained or determined by standardized or explicitly specified determination processes or by methods of determination which are familiar per se to the person skilled in the art in this field.

With this proviso, the present invention is described in greater detail below.

DETAILED DESCRIPTION OF THE INVENTION

Thus the subject of the present invention—according to a first aspect of the present invention—is a thermal insulation panel, which contains at least one aerogel and is open to diffusion along its main insulation direction.

Thus the thermal insulation panel according to the invention enables transport of water vapor from the masonry wall into the environment. Consequently the main insulation direction of the thermal insulation panel according to the invention extends perpendicular to the main surface, i.e. the largest surface, of the thermal insulation panel, which is also designated synonymously as a flat surface or broad surface.

Within the context of the present invention it is preferable if the aerogel is arranged as loose bulk material in the thermal insulation panel. As a result a particularly low water vapor diffusion resistance can be achieved, since no binding agent prevents the water vapor diffusion.

In general the thermal insulation panel includes an aerogel with absolute particle sizes in the range from 1 to 8, in particular 2 to 6, preferably 3 to 5. The use of aerogel with the aforementioned particle size enables, on the one hand, a particularly good water vapor diffusion and at the same time enables a very effective insulating effect, wherein the particles are robust enough in order to withstand vibrations without damage during storage and transport, cutting and installation of the thermal insulation panel.

In so far as the water vapor diffusion resistance of the thermal insulation panel according to the invention is concerned, this can vary within wide ranges. However, within the context of the present invention it is preferable if the thermal insulation panel has a water vapor diffusion resistance factor $\mu$ determined according to DIN EN ISO 12542, in the range from 1 to 8, in particular 1 to 6, preferably 2 to 5.

Thermal insulation panels made of polymer foams have substantially higher water vapor diffusion resistance factors, determined according to DIN EN ISO 12542. Thus have polyurethane hard foams and expanded polystyrene particle foam have $\mu$ values in the range from 50 to 80, whereas extruded polystyrene particle foam $\mu$ values in the range from 80 to 180.

Furthermore, according to a preferred embodiment of the present invention the thermal insulation panel has a thermal conductivity in the range from 0.008 to 0.040 W/(mK), in particular 0.010 to 0.035 W/(mK), preferably 0.011 to 0.030 W/(mK), more preferably 0.012 to 0.020 W/(mK). Thus the thermal insulation panel according to the invention almost reaches the extremely low thermal conductivity values of pure aerogel.

Furthermore, within the context of the present invention it is preferable if the thermal insulation panel has a structure which is at least substantially rectangular. This simplifies both storage and also installation of the thermal insulation panels.

The thermal insulation panel according to the invention generally has a thickness in the range from 1 to 8 cm, in particular 2 to 7 cm, preferably 2.5 to 6 cm, more preferably 3 to 5 cm. Thus the thermal insulation panel according to the invention has, by comparison with conventional thermal insulation panels on the basis of polystyrene or polyurethane, a substantially reduced thickness, wherein a reduction by the factor 3 to 4 is possible.

According to a preferred embodiment of the present invention it is provided that the thermal insulation panel has a basic body, consisting of the narrow sides of the thermal insulation panel and an internal structure with interstices, in particular cavities. In this case the basic body can be formed in one piece or also in multiple pieces.

The thermal insulation panel preferably has parallel to the main insulation direction an internal structure with interstices which are open at least on one side, in particular cavities, to hold the aerogel. In this case it may be provided that the interstices are open on both sides and extend over the entire thickness of the thermal insulation panel. Due to the internal structure with the cavities to hold the aerogel, on the one hand the thermal insulation panel acquires an increased mechanical stability, and on the other hand the loose bulk material of the aerogel in the thermal insulation panel used according to the invention is divided into smaller units, so that during transport and installation, i.e. during vibration, forces of lower strength act on the aerogel particles and thus these particles are treated carefully.

According to a preferred embodiment of the present invention the interstices are n-polygonal, in particular rectangular to octagonal, preferably hexagonal. Thus due to the internal structure honeycomb cavities, which are preferably completely open perpendicular to the diffusion direction or to the main thermal insulation direction, are preferably created in the thermal insulation panel.

In this case within the context of the present invention particularly good results are obtained if the openings of the interstices have surface areas parallel to the main surface in the range from 1 to 64 cm$^2$, in particular 3 to 36 cm$^2$, preferably 4 to 16 cm$^2$. Thus due to the internal construction a grid is preferably formed inside the thermal insulation panel, in particular by webs. This grid pattern of the thermal insulation panel on the one hand—as already mentioned above—protects the aerogel, but on the other hand enables simple assembly of the thermal insulation panel on the construction site or an adaptation of the dimensions of the thermal insulation panel to the size and shape of the surface to be insulated.

The basic body of the thermal insulation panel generally includes wood, plastics or mineral materials or consists at least substantially thereof. Within the context of the present invention a plurality of thermoplastic or thermosetting plastics are suitable for forming the basic body of the thermal insulation panel according to the invention, in particular plastics can be used which are based on (i) polyolefin, preferably polyethylene (PE) or polypropylene (PP); (ii) polymethacrylates (PMA); (iii) polymethyl methacrylates (PMMA); (iv) polyvinyl chloride (PVC); (v) polyvinylidene halide, in particular polyvinylidene fluoride (PVDV) or polyvinylidene chloride (PVDC); (vi) acrylonitrile/butadiene/styrene copolymer (ABS); (vii) polyamides (PA), polycarbonates (PC); (viii) melamine formaldehyde resins; (ix) epoxy resins; (x) phenolic resins or (xi) urea resins.

However, within the context of the present invention it is preferable if the basic body of the thermal insulation panel is made of mineral materials, since in this case the thermal insulation panel has the combustibility A1 or A2 according to DIN 4102. According to a further preferred embodiment the basic body of the thermal insulation panel consists at least substantially of wood; this has the advantage that with a relatively low weight a high stability is achieved and furthermore a further improved permeability for gases, in particular water vapor, is achieved.

The openings of the interstices are generally at least partially closed, in particular by a trickle protection. In this connection it may in particular be provided that on the broad surfaces of the thermal insulation panel a sheet material is arranged which is open to diffusion, in particular open to a flow, wherein it is preferable if the sheet material covers the broad surfaces of the thermal insulation panel. Closing of the opening of the interstices at least partially or in some areas with a trickle protection, in particular with a sheet material, on the one hand prevents undesirable falling out of the aerogel from the interstices in the thermal insulation panel. On the other hand, covering the opening only in some areas ensures an unhindered diffusion of water vapor through the thermal insulation panel. The sheet material preferably covers the broad surfaces of the thermal insulation panel completely.

Within the context of the present invention it is preferable if the sheet material is a textile or mineral sheet material, preferably a mineral sheet material, in particular a woven fabric, warp knitted fabric, weft knitted fabric, braided fabric, stitch-bonded fabric, non-woven fabric and/or a felt, or a mesh. In this connection it is preferable if the sheet material is a fabric with a mesh size or a grid spacing of 0.5 to 5 mm, in particular 1 to 4 mm, preferably 1.5 to 3 mm, more preferably 1.7 to 2.5 mm, wherein a fiberglass fabric is preferably used.

The aforementioned sheet materials are all open to diffusion or open to a flow and enable an unhindered passage of water vapor. Furthermore, the use of a sheet material, in particular a fiberglass fabric, with the above-mentioned mesh size serves not only as a trickle protection against inadvertent falling out of the aerogel from the interstices in the thermal insulation panel, but instead is also a reinforcement for a coating applied to the thermal insulation panel or a plaster, in particular a thermal insulation plaster, applied to the thermal insulation panel, wherein in particular when a plaster is used it can be anchored to the sheet material but does not penetrate into the panel. As a result the thermal insulation panel used according to the invention gives an increased mechanical resistance to a composite thermal insulation system into which it is integrated.

Within the context of the present invention the thermal insulation panel is generally applied to the surface to be insulated by means of a bonding adhesive, in particular by means of a 2-component boning adhesive, preferably based on methyl methacrylate or polyurethane. The use of bonding adhesives has the advantage over the use of insulation fixings that the thermal insulation panel and consequently also a composite thermal insulation system into which it is integrated is not damaged and furthermore the formation of a cold bridge is prevented by the insulation fixing.

A further subject of the present invention—according to a second aspect of the present invention—is a composite thermal insulation system (CTIS), which has a previously described thermal insulation panel and an insulation plaster system. In this case it is in particular provided that the thermal insulation panel is arranged on a surface to be insulated and the insulation plaster system is arranged after that, i.e. on the outside or on the side of the thermal insulation panel facing away from the surface to be insulated.

The insulation plaster systems used according to the invention are preferably plaster-based multi-layer thermal insulating systems.

The composite thermal insulation system according to the invention is characterized in particular in that it only has an extremely small thickness, is open to diffusion for water vapor and furthermore is mechanically very resilient, wherein, in spite of the small layer thickness by comparison with conventional composite thermal insulation systems, comparable or even improved insulation properties can be achieved.

The composite thermal insulation system generally has a thickness from 4 to 12 cm, in particular 5 to 10 cm, preferably 5.5 to 9 cm, more preferably 6 to 8 cm. In this case the layer thickness is dependent upon the local conditions, such as the properties of the masonry wall as well as the environment.

Thus due to the composite thermal insulation system according to the invention, by comparison with conventional composite thermal insulation systems having layer thicknesses in the range from 18 to 20 cm, an efficient thermal insulation can be achieved with a thickness of the composite thermal insulation system which is reduced by more than ⅔. According to a preferred embodiment of the present invention the composite thermal insulation system has a water vapor diffusion resistance factor µ, determined according to DIN EN ISO 12542, in the range from 4 to 12, in particular 5 to 10, preferably 6 to 8.

Furthermore, within the context of the present invention it is preferable if the composite thermal insulation system has a thermal conductivity in the range from 0.015 to 0.045 W/(mK), in particular 0.017 to 0.0340 W/(mK), preferably 0.020 to 0.035 W/(mK), more preferably 0.022 to 0.027 W/(mK).

Within the context of the present invention particularly good results are obtained if special insulation plaster systems, on the basis of insulation plaster containing aerogel, used as described below.

Insulation plasters preferably used according to the invention are obtainable on the basis of novel dry building material mixtures.

A dry building material mixture, in particular a plastering mortar, preferably for producing an insulation plaster, is described below, the dry building material mixture containing at least one aerogel.

Within the context of the present invention it is preferable in this case if the aerogel is silicate-based, in particular consists at least substantially of silica, and is preferably a pure silica aerogel.

The aerogel may be hydrophobic if required, which on the one hand has a positive influence on the water-repellent characteristics of the insulation material as well as the production of the aerogel, but on the other hand it lowers the porosity of the aerogel and thus lessens the insulating effect—albeit only slightly. Furthermore, a hydrophobic aerogel no longer complies with the combustible materials class A1 according to DIN EN 13501-1 and DIN 4102-1, but A2, i.e. evidence must be provided for the actual non-combustibility of the aerogel.

The hydrophobization of the aerogel can take place by conventional methods, but this is familiar to the person skilled in the art, so that further details are unnecessary at this point. By way of example, reference may be made to U. K. H. Bangi, A. V. Rao und A. P. Rao "A new route for preparation of sodium-silicate-based hydrophobic silica aerogels via ambient-pressure drying", Sci. Technol. Adv. Mater. 9, 2008.

With the dry building material mixture which is preferred according to the invention, insulation plasters are available, which have a substantially improved mechanical resistance by comparison with conventional insulation plasters containing aerogel.

The dry building material mixture can be processed, like conventional aerogel-free plaster systems, by simply making it up with water to produce an insulation plaster which can be applied mechanically to building walls and, both alone and also in the composite thermal insulation system, has substantially improved thermal insulation properties by comparison with the prior art.

Furthermore, the insulation plaster which is preferred according to the invention is open to diffusion, i.e. moisture from the masonry wall can be given off to the environment, so that the purely theoretically achievable heat transition coefficients of the insulating materials can actually also be obtained.

In general, the dry building material mixture contains the aerogel in quantities from 1 to 50% by weight, in particular 2 to 45% by weight, preferably 3 to 40% by weight, preferably 5 to 35% by weight, particularly preferably 10 to 30% by weight, especially preferably 15 to 25% by weight, in relation to the dry building material mixture. In particular in the aforementioned ranges particularly stable and durable insulation plasters are obtained, which have substantially improved insulation properties by comparison with conventional insulation plaster systems.

Particularly good results are obtained in the context of the present invention if the aerogel contained in the dry building material mixture has a particle size from 0.01 to 10 mm, in particular 0.05 to 8 mm, preferably 0.1 to 7 mm, preferably 0.2 to 6 mm, particularly preferably 0.5 to 5 mm, especially preferably 0.5 to 4 mm, extremely preferably 0.5 to 2 mm. The aerogels used in particular in the context of the present invention with particle sizes in the aforementioned ranges generally have, on the one hand, a relatively high mechanical stability and, on the other hand, are particularly compatible with the further particles present in the dry building material mixture.

The aerogel usually has a bulk density from 0.05 to 0.30 g/cm$^3$, in particular 0.08 to 0.27 g/cm$^3$, preferably 0.12 to 0.25 g/cm$^3$, preferably 0.13 to 0.22 g/cm$^3$, particularly preferably 0.14 to 0.20, especially preferably 0.15 to 0.16 g/cm$^3$.

Particularly good results are obtained in the context of the present invention, if the aerogel has absolute pore diameters in the range from 2 to 400 nm, in particular 5 to 300 nm, preferably 8 to 200 nm, preferably 10 to 130 nm, particularly preferably 10 to 70 nm. Aerogels which have pore sizes in the aforementioned range have, on the one hand, an extremely low thermal conductivity and, on the other hand, a comparatively high mechanical stability.

According to a preferred embodiment of the present invention the aerogel is at least substantially dimensionally stable under the application conditions of the made up dry building material mixture, i.e. in particular as insulation plaster. In this case it is in particular preferred if at least 70% by weight, preferably at least 80% by weight, more preferably at least 90% by weight, particularly preferably at least 95% by weight, of the aerogel particles used remain dimensionally stable under application conditions. It is a distinctive feature of the aerogel used according to the invention that the aerogel particles, in particular when applied mechanically, especially with the aid of plastering machines in which a pressure of up to 7 or 8 bars acts on the aerogel particles, remain dimensionally stable and are not destroyed, which leads to the particularly good thermal insulation properties and at the same time to high mechanical resistance of the insulation plaster according to the invention.

With aerogels which have the aforementioned parameters and characteristics an insulation plaster can be obtained which is mechanically particularly resistant, durable and offer excellent heat insulation. In particular when the aerogel particles are incorporated into the plaster or into the dry building material mixture these aerogel particles exhibit a substantially higher mechanical load-bearing capacity and resistance than has been the case hitherto with comparable products according to the prior art.

Within the context of the present invention, hydrophobic aerogels which are likewise preferably used have a contact angle with water of 110 to 165°. Furthermore the thermal conductivity of such preferably used hydrophobic aerogels is in the range from 0.015 to 0.032 W/(mK), in particular 0.019 to 0.025 W/(mK), preferably 0.020 to 0.022 W/(mK). However, within the context of the present invention particularly good results are also obtained if the thermal conductivity of the aerogels is in the range from 0.015 to 0.016 W/(mK).

Furthermore, within the scope of the present invention it may be provided that the dry building material mixture also contains at least one aggregate.

The aggregates employed or used within the context of the present invention are known per se to the person skilled in the art. Within the context of the present invention the term "aggregate" should be understood to mean in particular concrete aggregates according to DIN 1045. The aggregates are fillers with particle sizes which are suitable for production of the respective binding agent. For more extensive information on the expression "aggregate" reference is made in particular to Römpp Chemielexikon, 10th edition, Georg-Thieme-Verlag, Stuttgart/New York, Vol. 1, 1998, pages 419 and 420, key word: "concrete aggregate" as well as the literature referred to there, the respective content is hereby incorporated in full by reference.

If the dry building material mixture contains an aggregate, this is generally selected from natural or artificial rocks, metals or glasses. In this connection, within the context of the present invention particularly good results are obtained if the aggregate is a lightweight aggregate, in particular with a particle gross density of at most 2.0 kg/dm$^3$. In this connection it has proved advantageous if the lightweight aggregate is selected from the group comprising volcanic rock, perlite, vermiculite, pumice, foam glass and expanded glass, expanded clay, expanded shale, expanded polystyrene, tuff, expanded mica, cinders, lava sand, foam plastics and mixtures thereof, preferably perlite.

Likewise, within the context of the present invention particularly good results are obtained if the lightweight aggregate has particle sizes of at most 4 mm, in particular at most 3 mm. Lightweight aggregates with the aforementioned particle sizes, in particular in the case of perlite, can interact with the aerogel particles—without being committed to this theory—wherein the aerogel is in particular embedded in the cavities between the individual perlite particles in the dry building material mixture as well as in the insulation plaster and is protected there from mechanical destruction.

If the dry building material mixture contains a lightweight aggregate it may be provided that the dry building material mixture contains the lightweight aggregate in quantities from 20 to 90% by weight, in particular 30 to 80% by weight, preferably 40 to 75% by weight, preferably 45 to 70% by weight, particularly preferably 50 to 65% by weight, in relation to the dry building material mixture.

Particularly good results are obtained within the context of the present invention if the dry building material mixture contains the aerogel and the lightweight aggregate in a weight-based ratio of aerogel to lightweight aggregate from 6:1 to 1:50, in particular 5:1 to 1:40, preferably 2:1 to 1:25, more preferably 1:1 to 1:13, particularly preferably 1:2 to 1:6, especially preferably 1:2 to 1:4.

In particular in the aforementioned weight-based ratios of aerogel to lightweight aggregate appears, that the aerogel particles are retained in the insulation plaster, in particular even in the event of mechanical application.

In general the dry building material mixture contains at least one binding agent. In particular, particularly good results are obtained if the dry building material mixture contains the binding agent in quantities from 5 to 98% by weight, in particular 8 to 75% by weight, preferably 10 to 50% by weight, preferably 12 to 40% by weight, particularly preferably 15 to 35% by weight. Thus the dry building material mixture according to the invention as well as the thermal insulation plaster according to the invention contain the binding agent preferably in a rather small amount, whereas the aerogel and aggregate materials are present in a substantially greater amount, which leads to substantially improved thermal insulation properties.

According to a preferred embodiment of the present invention the dry building material mixture includes two different binding agents. In this case particularly good results are achieved if the dry building material mixture includes a lime-based binding agent, in particular hydraulic lime, and a cement-based binding agent, in particular white Portland cement. Mixtures of the aforementioned binding agents exhibit a particularly good setting behavior and have a consistency and viscosity which ensure good application of the insulation plaster and, in spite of the high proportion of aggregate materials, lead to an outstanding final strength. Furthermore the proportion of lime, due to its high alkalinity, additionally inhibits the formation of molds and algae. The insulation plaster according to the invention which can be obtained with the dry building material mixture is open to diffusion, so that a formation of mold is counteracted from the outset, but the use of a lime-based binding agent also suppresses the formation of molds and algae in the event that the insulation plaster is applied under unfavorable conditions.

In this case within the context of the present invention a hydraulic lime is understood to be a mixture of quicklime (calcium hydroxide) with hydraulic agents, such as for example calcium silicates and calcium aluminates or also iron oxide. The hydraulic proportion of the binding agent hardens by hydration and requires no carbon dioxide for setting. In this way the binding agent acquires a high initial strength, whereas the non-hydraulic proportion of the lime cures or sets slowly by diffusion of carbon dioxide in the insulation plaster.

If the dry building material mixture contains a lime-based binding agent it has proved worthwhile if the dry building material mixture contains the lime-based binding agent in quantities from 4 to 97% by weight, in particular 5 to 75% by weight, preferably 7 to 50% by weight, preferably 8 to 40% by weight, particularly preferably 10 to 30% by weight, especially preferably 15 to 30% by weight, in relation to the dry building material mixture.

Likewise, within the context of the present invention good results are obtained if the dry building material mixture contains the cement-based binding agent in quantities from 1 to 20% by weight, in particular 1 to 15% by weight, preferably 1.5 to 12% by weight, preferably 1.5 to 10% by weight, particularly preferably 2 to 8% by weight, especially preferably 2 to 5% by weight, in relation to the dry building material mixture.

According to a particular preferred embodiment of the present invention the dry building material mixture contains the lime-based binding agent in a weight-based ratio of lime-based binding agent to cement-based binding agent from 1:5 to 30:1, in particular 1:2 to 20:1, preferably 1:1 to 15:1, more preferably 2:1 to 10:1, particularly preferably 3:1 to 8:1, especially preferably 4:1 to 7:1.

Furthermore, within the scope of the present invention it may be provided that the dry building material mixture also contains at least one additive, in particular at least one admixture. In this case it may be provided that the additive is selected from the group of liquefiers, thickeners, retardants, accelerants, stabilizing agents (stabilizers), rheology adjusting agents, admixtures for adjusting the water retention capacity (water retention agents), dispersants, sealants, air-entraining agents as well as mixtures thereof.

In so far as the quantity of additive in the dry building material mixture preferably used according to the invention is concerned, this can vary within wide ranges. Within the context of the present invention, however, good results are obtained in particular when the dry building material mixture contains the additive in quantities from 0.01 to 10% by weight, in particular 0.1 to 5% by weight, preferably 0.3 to 3% by weight, preferably 0.5 to 1% by weight, in relation to the dry building material mixture.

Within the context of the present invention particularly good results are obtained in particular with a dry building material mixture which contains
(A) aerogel in quantities from 3 to 40% by weight, in particular 5 to 35% by weight, preferably 10 to 30% by weight, preferably 15 to 25% by weight, in relation to the dry building material mixture,
(B) at least one lightweight aggregate, in particular perlite, in quantities from 30 to 80% by weight, in particular 40 to 75% by weight, preferably 45 to 70% by weight, preferably 50 to 65% by weight, in relation to the dry building material mixture,
(C) at least one lime-based binding agent, in particular hydraulic lime, in quantities from 7 to 50% by weight, in particular 8 to 40% by weight, preferably 10 to 30% by weight, preferably 15 to 30% by weight, in relation to the dry building material mixture,
(D) at least one cement-based binding agent, in particular white Portland cement, in quantities from 1.5 to 12% by weight, in particular 1.5 to 10% by weight, preferably 2 to 8% by weight, preferably 2 to 5% by weight, in relation to the dry building material mixture, and
(E) at least one additive in quantities from 0.01 to 10% by weight, in particular 0.1 to 5% by weight, preferably 0.3 to 3% by weight, preferably 0.5 to 1% by weight, in relation to the dry building material mixture.

Furthermore, within the scope of the present invention it may be provided that the dry building material mixture has a bulk density in the range from 100 to 400 kg/m$^3$, in particular 150 to 350 kg/m$^3$, preferably 175 to 300 kg/m$^3$, preferably 200 to 250 kg/m$^3$.

The previously described dry building material mixture, in particular the plastering mortar, enables the production of an insulation plaster which is preferred according to the invention, in particular a thermal insulation plaster, for thermal insulation of constructions, in particular buildings.

An insulation plaster, in particular a thermal insulation plaster, for thermal insulation of constructions or buildings, which can be obtained from a previously described dry building material mixture, in particular a plastering mortar, is preferred according to the invention. In this case it may in particular be provided that the insulation plaster can be obtained by making up a previously described dry building material mixture with water, in particular of a plastering mortar.

Within the context of the present invention particularly good results are obtained if the insulation plaster is obtainable by making it up with water in quantities from 70 to 150% by weight, in particular 80 to 130% by weight, preferably 90 to 110% by weight, in relation to the dry building material mixture. Consequently the insulation plaster according to the invention can be made up and also processed like a conventional insulation plaster which is known from the prior art.

The cured insulation plaster, even without further coating, usually has an outstanding barrier effect with respect to liquid water, whereas water vapor can diffuse relatively problem-free through the cured insulation plaster. Thus within the context of the present invention the cured insulation plaster usually has a water absorption coefficient w in the range from 1.0 to 1.8 kg/(m$^2 \cdot$h$^{0.5}$), in particular 1.10 to 1.80 kg/(m$^2 \cdot$h$^{0.5}$), preferably 1.20 to 1.70 kg/(m$^2 \cdot$h$^{0.5}$).

In general the insulation plaster is applied by means of conventional methods to the surface to be treated, in particular by means of mechanical spraying processes. It is a distinctive feature of the insulation plaster which is preferred according to the invention that, in spite of its high aerogel content, it can be applied by means of mechanical spraying processes, in particular by means of plastering machines, to the surface to be insulated, in particular a building wall. As already previously stated, the insulation plaster which is preferred according to the invention is characterized in that the aerogel contained therein is at least substantially dimensionally stable under application conditions, in particular with mechanical application, in particular wherein at least 70% by weight, in particular at least 80% by weight, preferably at least 90% by weight, preferably at least 95% by weight, of the aerogel particles used remain dimensionally stable.

An insulation plaster is likewise preferred which contains at least one aerogel and can be obtained in particular from a previously described dry building material mixture, wherein the cured insulation plaster has a thermal conductivity in the range from 0.02 to 0.055 W/(mK), in particular 0.022 to 0.050 W/(mK), preferably 0.024 to 0.045 W/(mK), preferably 0.026 to 0.040 W/(mK), particularly preferably 0.028 to 0.032 W/(mK). Thus the (thermal) insulation plaster according to the invention has thermal conductivity values such as are usually only observed in composite thermal insulation systems.

In general the cured insulation plaster has a compressive strength from 0.4 to 2.5 N/mm$^2$, in particular 0.4 to 2.0 N/mm$^2$, preferably 0.45 to 1.6 N/mm$^2$, preferably 0.45 to 1.4 N/mm. Thus the insulation plaster containing aerogel according to the invention has an extremely high compressive strength for thermal insulation plasters.

Within the context of the present invention it is preferable if the cured insulation plaster has a water vapor diffusion resistance factor μ, determined according to DIN EN ISO 12542, in the range from 2 to 9, in particular 3 to 7, preferably 4 to 6. As already mentioned above, the insulation plaster according to the invention is characterized in that it is open to diffusion and moisture can be given off from the masonry wall to the environment, which counteracts the formation of molds and algae and furthermore increases the durability of the thermal insulation system.

The cured insulation plaster usually has a dry bulk density in the range from 200 to 350 kg/m$^3$, in particular 225 to 325 kg/m$^3$, preferably 250 to 300 kg/m$^3$.

In so far as the layer thickness with which the insulation plaster is applied to a surface, in particular to a building wall, is concerned, this can vary within wide ranges. However, within the context of the present invention particularly good results are achieved if the cured insulation plaster is applied with a layer thickness from 1 to 14 cm, in particular 1 to 8 cm, preferably 2 to 7 cm, to the surface to be insulated, in particular the internal or external surfaces of a building wall. In this case, furthermore, it is preferable if the cured insulation plaster is applied to the external surface of a building wall, i.e. is used as an external insulation. In this case the thermal insulation plaster which is preferably used according to the invention can be applied in particular directly to the masonry wall, or the masonry wall can be specifically prepared beforehand, for example by application of a primer. Primers which strengthen the masonry wall or effect an improved adhesion of the plaster to the masonry, are well known to the person skilled in the art, so that further details are unnecessary at this point.

Furthermore, in so far as the layer thickness of the cured insulation plaster is concerned, the above-mentioned value ranges only apply to one single application of the insulation plaster according to the invention or an insulation plaster system which contains the insulation plaster according to the invention, whereas when the insulation plaster according to the invention is used in a composite thermal insulation system (CTIS), in particular in a composite thermal insulation system (CTIS) having a thermal insulation panel according to the invention, substantially smaller layer thicknesses of the insulation plaster which is preferably used, as set out below.

It is a distinctive feature of the insulation plaster which is preferred according to the invention that it can be used both for interiors and also for exteriors, in particular where, even with the sole use of the insulation plaster according to the invention or an insulation plaster system containing said plaster, in the field of external insulation outstanding thermal insulation results and simultaneously a very good mechanical load-bearing capacity insulation are achieved. The sole application of the thermal insulation plaster or an insulation plaster system is recommended, for example, when the contours of a building are to be reproduced in precise detail. Otherwise a composite thermal insulation system (CTIS) is preferred, since with this even better thermal insulation can be achieved.

Furthermore, within the context of the present invention it may be provided that the cured insulation plaster exhibits the combustibility A1 or A2 according to DIN 4102. Since the insulation plaster which is preferred according to the invention is preferably purely mineral-based, it is not combustible and exhibits the combustibility A1 according to DIN 4102. When hydrophobic aerogels as well as organic additives are used, the insulation plaster which is preferred according to the invention is still not combustible, but evidence of this must be produced, which corresponds to a combustibility A2 according to DIN 4102.

For further details of the insulation plaster reference may be made to the preceding statements which apply appropriately with regard to the insulation plaster according to the invention.

Within the context of the present invention particularly good results are achieved with insulation plaster systems containing aerogel. A multi-layer insulation plaster system which is preferred according to the invention has at least one insulation plaster layer, consisting of an insulation plaster containing at least one aerogel as previously described, and a surface coating, wherein the surface coating is arranged at least on a surface provided with the insulation plaster system, in particular a side of the insulation plaster layer facing away from a building wall. In this connection it is preferable if the surface coating at least substantially covers the side of the insulation plaster layer facing away from the surface provided with the insulation plaster system.

In this case the application of the surface coating can take place continuously or only in some regions, wherein a continuous surface coating in particular on the outside of the insulation plaster system, i.e. on the side of the insulation plaster system facing away from the surface to be insulated, is preferred.

In general the surface coating is watertight, in particular impermeable to driving rain, and/or is open to diffusion. Thus surface coatings which are preferably used according to the invention prevent the penetration of liquid water into the insulation plaster system but, on the other hand, enable the diffusion of water vapor out of the masonry wall into the environment, so that the masonry wall is constantly dehumidified.

Particularly good results are obtained within the context of the present invention if the surface coating has a layer thickness from 50 to 400 μm, in particular 100 to 300 μm, preferably 150 to 250 μm. In this case the surface coating can be produced by one single application or, as required, by multiple applications, i.e. within the scope of the invention the surface coating can consist of a plurality of layers, wherein the overall thickness of the surface coating preferably lies within the range specified above.

Surface coatings based on polymer, in particular based on acrylate, have been shown to be particularly suitable. Although these are permeable to water vapor, they are nevertheless impermeable to liquid water and have an excellent expandability of up to 150%. As a result such surface coatings have the effect of bridging cracks, i.e. in the event of cracks occurring in the insulation the surface coating does not inevitably also crack, thereby enabling the ingress of water into the insulation system, but on the contrary it retains its protective function. This considerably increases the durability of the insulation system or of the insulation plaster system. Particularly suitable acrylate dispersions are obtainable as water-based dispersions with a proportion of solids of up to 60% and have no organic solvents. Such acrylate dispersions are commercially available and are quite familiar to the person skilled in the art.

Furthermore, within the scope of the present invention it may be provided that at least one primer layer is arranged between the insulating plaster layer containing aerogel and the surface coating. The primer layer can likewise consist of one or a plurality of layers and has in particular a layer thickness from 25 to 100 μm, in particular 35 to 75 μm, preferably 45 to 60 μm. Suitable primers coat are in principle all primers which ensure improved adhesion of the surface coating to the material to be coated and furthermore consolidate the predominantly mineral-based plaster system. Such primer systems are known and familiar to the person skilled in the art. However, it is preferable if the primer used is likewise open to diffusion, i.e. it does not preclude dehumidification of the masonry wall.

According to a preferred embodiment of the present invention, between the insulation plaster layer, which contains an aerogel, and the primer layer or the surface coating at least one further insulation plaster layer is arranged which in particular does not contain any aerogel. In this case it is likewise preferable if the further insulation plaster layer is arranged on the side of the insulation plaster which contains an aerogel and faces away from the surface provided with the insulation plaster system.

The use of a further thermal insulation plaster in particular increases the mechanical load-bearing capacity, such as for example the compressive strength of the entire insulation plaster system, and, in particular when arranged externally, furthermore protects the insulation plaster which contains aerogel.

If the insulation plaster system contains a further insulation plaster layer, this generally has a layer thickness in the range from 0.1 to 2 cm, in particular 0.2 to 1.5 cm, preferably 0.3 to 1.0 cm, more preferably 0.4 to 0.7 cm. Thus within the context of the present invention the further insulation plaster layer, which in particular contains no aerogel, is applied with only an extremely small layer thickness onto the outside of the insulation plaster layer, which contains an aerogel, in order to protect the insulation plaster layer against mechanical influences.

Furthermore, within the context of the present invention it is preferable if the insulation plaster layer has a thermal conductivity in the range from 0.02 to 0.12 W/(mK), in particular 0.03 to 0.10 W/(mK), preferably 0.05 to 0.09 W/(mK), more preferably 0.06 to 0.08 W/(mK)

Likewise within the context of the present invention particularly good results are obtained if the further insulation plaster layer has a compressive strength from 1.3 to 4.0 N/mm$^2$, in particular 1.4 to 3.5 N/mm$^2$, preferably 1.5 to 3.2 N/mm$^2$, more preferably 1.6 to 3.0 N/mm.

In general the further insulation plaster layer has a water vapor diffusion resistance factor μ, determined according to DIN EN ISO 12542, in the range from 3 to 10, in particular 4 to 8, preferably 5 to 7.

Furthermore, it may be provided that the further insulation plaster layer has a dry bulk density in the range from 200 to 350 kg/m$^3$, in particular 250 to 325 kg/m$^3$, preferably 290 to 310 kg/m$^3$.

By the use of the further insulation plaster layer, which in particular contains no aerogel, the mechanical characteristics of the insulation plaster system can be improved, wherein simultaneously. because of the small layer thickness of the further insulation plaster layer, the thermal insulation capacity as well as the water vapor diffusion resistance of the insulation plaster system are only slightly influenced.

According to a preferred embodiment of the present invention the further insulation plaster layer contains a lightweight aggregate. In so far as the quantity of lightweight aggregate in the further insulation plaster layer is concerned, this can vary within wide ranges. However, particularly good results are obtained if the further insulation plaster layer contains a lightweight aggregate in quantities from 30 to 90% by weight, in particular 40 to 65% by weight, preferably 50 to 80% by weight, in relation to the further insulation plaster or a corresponding dry building material mixture.

Furthermore, the further insulation plaster layer generally contains at least one binding agent. However, within the context of the present invention it is preferable if the further insulation plaster layer contains at least one lime-based binding agent, in particular hydraulic lime, and at least one cement-based binding agent, in particular white Portland cement. In this case it is preferable according to the invention if the further insulation plaster layer contains the lime-based binding agent in quantities from 5 to 50% by weight, in particular 10 to 40% by weight, preferably 10 to 30% by weight, in relation to the further insulation plaster or a corresponding dry building material mixture, and contains the cement-based binding agent in quantities from 1 to 15% by weight, in particular 2 to 10% by weight, preferably 3 to 5% by weight, in relation to the further insulation plaster or a corresponding dry building material mixture.

The lightweight aggregate used for the further insulation plaster layer has in particular a particle gross density of at most 2.0 kg/dm$^3$ and is in particular selected from the group comprising volcanic rock, perlite, vermiculite, pumice, foam glass and expanded glass, expanded clay, expanded shale, expanded polystyrene, tuff, expanded mica, cinders, lava sand, foam plastics and mixtures thereof, preferably perlite, in particular with particle sizes of at most 3 mm, in particular at most 2 mm.

At the aforementioned weight ratios it is possible to observe very good strength values and a very good and uniform setting of the further insulation plaster layer. In addition, the adhesion to the insulation plaster layer containing an aerogel is also increased, since similar binding agent systems are preferably used in each case.

If the insulation plaster system includes, in addition to the insulation plaster layer containing an aerogel, a further insulation plaster layer which in particular contains no aerogel, a support layer is generally arranged between the insulation plaster layer which contains an aerogel and the further insulation plaster layer. The support layer is constructed in particular in the form of a reinforcement and is preferably a fiberglass fabric or a fiberglass mesh. The use of a support layer, in particular in the form of a reinforcement, additionally gives the insulation plaster system according to the invention further mechanical load-bearing capacity and avoids the formation of cracks, since stresses can be equalized. A reinforcement also makes it possible that the two insulation plaster layers are directly in contact with one another and so can form a particularly close bond, wherein both insulation plaster layers are anchored on and in the reinforcement. The use of fiberglass fabrics or fiberglass meshes is particularly advantageous, since these are both alkali-resistant and also non-combustible. Reinforcements, in particular fiberglass fabric, are preferably used with mesh sizes or a mesh aperture size in the range from 16 mm$^2$ to 400 mm$^2$, in particular 49 mm$^2$ to 300 mm$^2$, preferably 100 mm$^2$ to 200 mm$^2$.

An insulation plaster system which is preferred according to the invention preferably has the following structure, starting from a surface provided with the insulation plaster system, i.e. from the inside to the outside:
  insulation plaster layer, containing at least one aerogel,
  support layer,
  further insulation plaster layer,
  primer layer and
  surface coating.

Such insulation plaster systems combine both a high thermal insulation capacity and also a high mechanical load-bearing capacity.

Within the context of the present invention the insulation plaster system has a water vapor diffusion resistance factor μ, determined according to DIN EN ISO 12542, in the range from 4 to 12, in particular 5 to 10, preferably 6 to 8.

Furthermore, within the context of the present invention it is preferable if the insulation plaster system, exhibits the combustibility A1 or A2 according to DIN 4102. Thus the insulation plaster system according to the invention is not combustible and consequently complies with the maximum fire prevention regulations, and for this reason it can also be installed without problems in sensitive areas.

The insulation plaster system generally has a layer thickness in the range from 1.5 to 14 cm, in particular 2.5 to 9 cm, preferably 3.5 to 8 cm.

However, the aforementioned layer thicknesses or thicknesses of the insulation plaster system only apply if the insulation plaster system is applied directly to a building wall, in particular a masonry wall. If the insulation plaster system is used as part of a composite thermal insulation system (CTIS) it can have substantially smaller layer thicknesses. Thus the insulation plaster system enables an effective thermal insulation with small layer thicknesses and an outstanding mechanical load-bearing capacity.

When the insulation plaster system is used in a composite thermal insulation system according to the invention it may in particular be provided that the thermal insulation layer containing aerogel has a layer thickness of 0.5 to 4 cm, in particular 1 to 3 cm, preferably 1.5 to 3 cm, more preferably 1.5 to 2.5 cm.

Likewise in this connection it may be provided that the further insulation plaster layer, which in particular contains no aerogel, has a layer thickness in the range from 0.1 to 2 cm, in particular 0.2 to 1.5 cm, preferably 0.3 to 1.0 cm, more preferably 0.4 to 0.7 cm. Within the context of the present invention outstanding results are obtained with the aforementioned layer thicknesses of the insulation plaster system or the insulation plaster layers as part of the composite thermal insulation system according to the invention.

For further details of the insulation plaster or insulation plaster system reference may be made to the preceding statements which apply appropriately with regard to the insulation plaster or the insulation plaster system.

Finally, the composite thermal insulation system according to the invention can have an insulation plaster panel, which consists of an insulation plaster containing at least one aerogel as previously described or an insulation plaster system as previously described. The thermal insulation system according to the invention is of modular construction in this case.

The insulation plaster panel which can be used according to the invention is suitable in particular for the internal fittings, in particular for roof construction, especially for insulation below and between the rafters.

For internal use, different primers and coatings are used than those used for external insulation. However, this is familiar to the person skilled in the art, so that no further statements are required in this connection.

In so far as the thickness of the insulation plaster panel which can be used according to the invention is concerned, this can vary within wide ranges. However, within the context of the present invention particularly good results are obtained if the insulation plaster panel has a thickness from 1 to 6 cm, in particular 1.5 to 5.5 cm, preferably 1.5 to 5 cm, more preferably 2 to 4 cm.

For further details of the insulation plaster panel reference may be made to the preceding statements which apply appropriately with regard to the insulation plaster panel.

Further advantages, properties, aspects and features of the present invention result from the following description of a preferred embodiment according to the invention which is illustrated in the drawings.

Figure 1:
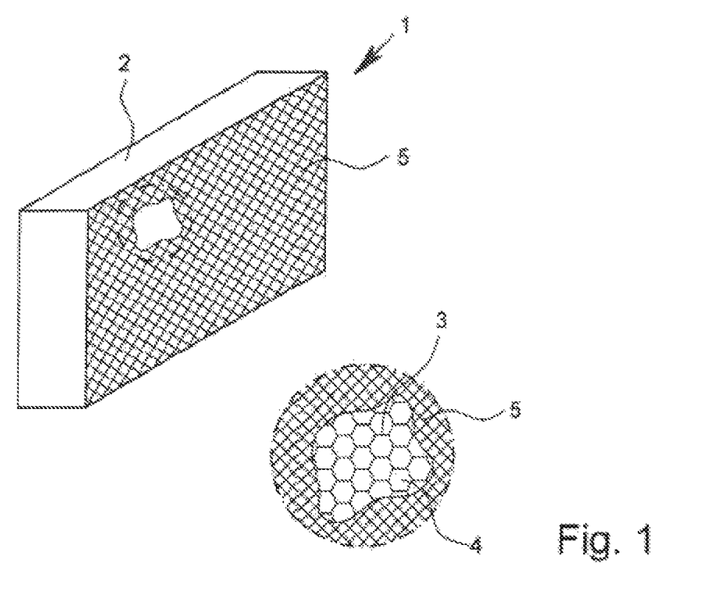
FIG. 1 shows the schematic structure of a thermal insulation panel 1 according to the invention.

In the drawings:

FIG. 1 shows the schematic structure of a thermal insulation panel 1 according to the invention.

Figure 2:
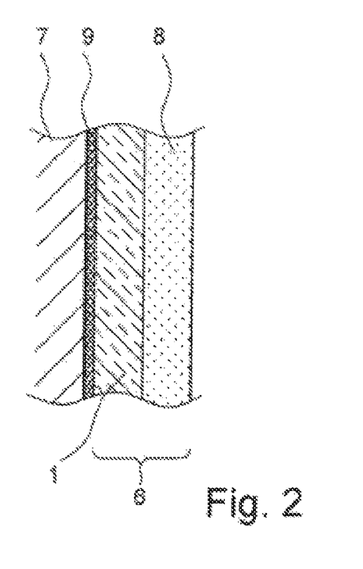
FIG. 2 shows a schematic representation of a composite thermal insulation systems 6 according to the invention which is applied to a building wall 7.
Figure 3:
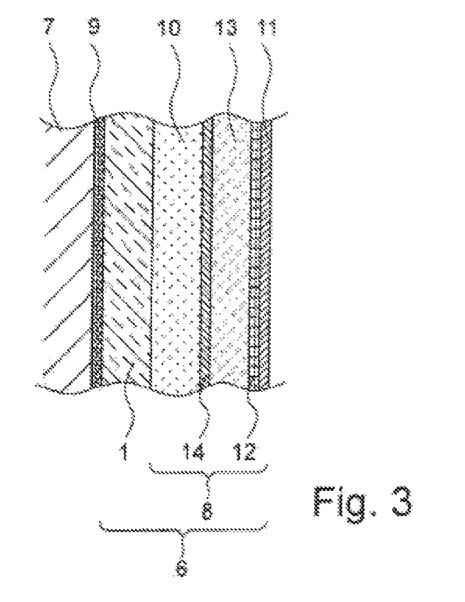
FIG. 3 shows a schematic representation of a composite thermal insulation systems 6 which is preferred according to the invention which is applied to a building wall 7.

FIG. 2 shows a schematic representation of a composite thermal insulation systems 6 according to the invention which is applied to a building wall 7;

FIG. 3 shows a schematic representation of a composite thermal insulation systems 6 which is preferred according to the invention which is applied to a building wall 7;

In particular FIG. 1 shows a preferred embodiment according to the invention of the thermal insulation panel 1 according to the invention. The thermal insulation panel 1 has a basic body, which is formed by the narrow sides 2 of the thermal insulation panel as well as an internal structure 3. The internal structure 3 forms hexagonal, in particular honeycomb cavities 4, which extend uniformly over the entire thickness of the thermal insulation panel 1 and contain an aerogel. The main surfaces or broad surfaces of the thermal insulation panel 1 are covered with a sheet material 5, in particular with a fiberglass fabric which has a mesh size of 2×2 mm, in particular the broad surfaces of the thermal insulation panel 1 are covered with a sheet material. The fiberglass fabric serves, on the one hand, as a trickle protection against inadvertent falling out of the aerogel from the interstices 4 of the thermal insulation panel 1 and, on the other hand, as an anchor or reinforcement for plaster layers, wherein the plaster does not penetrate into the interior of the panel, at least not substantially into the interior of the plate.

In particular FIG. 2 shows the composite thermal insulation system 6 according to the invention which is applied to a house wall 7. The composite thermal insulation system 6 according to the invention consists of the thermal insulation panel 1 and an insulation plaster system 8 applied externally thereto, wherein the insulation plaster system 8 can be constructed in multiple layers. Likewise it is possible that the insulation plaster system 8 is present in the form of an insulation plaster panel and is for example screwed to the thermal insulation panel. The composite thermal insulation system 6 is fastened by means of a 2-component adhesive 9 to the house wall 7 and is designed to be both open to diffusion and also impermeable to driving rain.

FIG. 3 shows in particular a schematic representation of a composite thermal insulation systems 6 which is preferred according to the invention which consists of a thermal insulation panel 1 and an insulation plaster system 8 which is preferred according to the invention. The insulation plaster panel 1 is fastened by means of a 2-component adhesive 9 to the house wall 7. The insulation plaster system 8 which is preferred according to the invention is applied directly to the thermal insulation panel 1 in the main insulation direction, i.e. onto the main surface or broad surface of the thermal insulation panel 1, wherein the insulation plaster layer 10 containing at least one aerogel directly adjoins the insulation plaster panel 1. The insulation plaster system 8 according to the invention has, in addition to an insulation plaster layer 10 containing an aerogel, at least one surface coating 11 which is proof against driving rain and is open to diffusion. Between the surface coating 11 and the insulation plaster layer 10 is provided a primer layer 12 which ensures good adhesion between the surface coating 11 and the layers of the insulation plaster system 8 lying below it. A further insulation plaster layer 13 which contains no aerogel is arranged between the primer layer 12 and the insulation plaster layer 10, and a support layer 14, which preferably consists of a fiberglass fabric with a mesh size of 13×13 mm, is located between the insulation plaster layers 10 and 13. The composite thermal insulation system 6 according to the invention is open to diffusion and proof against driving rain.

Exemplary Embodiments a) Production of a Thermal Insulation Panel

A 1 m×0.5 m wood construction in panel form with a honeycomb internal construction, having a cell width of 2×2 cm, is closed on one side by adhesion by means of a fiberglass fabric with a mesh size of 2×2 mm. The cells of the internal construction are filled with a coarse-grained aerogel with particle sizes in the range from 3 to 5 mm and also the second surface of the basic design is closed by adhesion by a fiberglass fabric with a cell width of 2×2 mm. The thickness of the thermal insulation panel is 5 cm.

2. Production of a Composite Thermal Insulation System 2.1. Production of a Thermal Insulation Plaster Containing Aerogel A) Production of the Aerogel The aerogel used for production of an insulation plaster containing aerogel is produced in a multi-stage method, comprising the following method steps:

1. Production of the Hydrosol

A commercial sodium silicate solution is diluted with deionized water and is then led through a highly acidic cation exchanger resin on the basis of sulfonated and divinylbenzene crosslinked polystyrene. A hydrosol in which the sodium ions of the silicate are almost completely replaced by protons is obtained as a reaction product. The completeness of the ion exchange reaction is checked by conductivity measurement.

2. Production of a Hydrogel

The hydrosol obtained in method step 1 is heated to 50° C. and admixed with N,N-dimethyl formamide with constant stirring. For acceleration of the starting condensation reaction, molar aqueous ammonia solution is added to the mixture 6 until the solution a reaches weakly acidic pH value in the range from 4.2 to 4.9. In order to form the gel the hydrosol is left to mature for several hours at constant temperature. Then by addition of deionized water, while maintaining constant temperature and stirring, the resulting hydrogel is crushed to particle sizes in the range from 0.5 to 1 cm. The mixture containing the hydrogel is cooled to 35° C. and again left to mature for several hours.

3. Production of the alcogel

The hydrogel obtained in method step 3 is admixed with methanol until the volume ratios of water and methanol are approximately the same. Then the gel rests for several hours. Next a majority of the solvent is separated off from the reaction mixture by filtration. Then the remaining residue is again admixed with methanol. A slow solvent exchange takes place, in which water is replaced by methanol. The separation of the solvent mixture and the addition of methanol are repeated if required. An alcogel is produced which matures for several hours at constant temperature.

The recovered solvent mixture is transferred to a distillation apparatus and separated by distillation.

4. Surface Modification

The alcogel obtained in method step 3 is admixed, at constant temperature with stirring, with a solution of hexamethyl disilazane and in n-hexane, with nitric acid being used as catalyst After a reaction time of 20 hours is the surface reaction is largely completed.

5. Solvent Exchange

The reaction mixture obtained in method step 4 is separated by filtration from a majority of the solvent and the remaining residue is admixed with n-hexane. The step is repeated multiple times if required. In this way the methanol is largely replaced by n-hexane.

The recovered solvent mixture is transferred to a distillation apparatus and separated by distillation.

6. Drying

The remaining solvent—primarily n-hexane—is removed by distillation and the alcogel granulate still wetted with solvent residues is removed from the reaction vessel and dried in a vacuum at 50° C. for several hours while being carefully stirred and shaken.

In this way a silica aerogel with the following characteristics is obtained:

particle size: 0.5 to 5 mm,
density: 0.18 to 0.20 g/cm$^3$,
contact angle 110 to 150°,
thermal conductivity: 0.024 to 0.026 W/(mK),
pore diameter: 100 to 300 nm,
Transparency to light: none The aerogel obtained is subdivided into the required size fractions by sieving.

B) Production of the Insulation Plaster

A plastering mortar, consisting of
hydraulic lime (21 parts by weight),
white Portland cement (3 parts by weight),
perlite (55 parts by weight),
aerogel produced as described above, with particle sizes in the range from 0.5 to 3 mm (20 parts by weight) as well as
additives (1 part by weight)
with a bulk density of 250 kg/m$^3$ is processed by making it up with water to produce an insulation plaster.

50 liters of the plastering mortar are made up with 15 liters of water, 40 liters of fresh mortar being obtained.

The thermal insulation plaster containing aerogel has a thermal conductivity of 0.034 W/(mK). The water absorption coefficient w is 1.24 kg/(m$^3$·h$^{0.5}$), i.e. the plaster is water-resistant.

2.2. Structure and Application of the Composite Thermal Insulation System

A total of 9 of the thermal insulation panels produced according to 1) are applied in an arrangement of 3×3 thermal insulation panels, i.e. in each case three thermal insulation panels one above the other and three thermal insulation panels adjacent to one another, applied to a wall by means of a 2-component polyurethane bonding adhesive. The adhesion takes place at certain points. Then a 2 cm thick layer of the insulation plaster produced under 2.1. and containing an aerogel is applied and then provided with a fiberglass reinforcement made of a fiberglass fabric with a mesh size of 10×10 mm. After drying of the thermal insulation plaster layer a further thermal insulation plaster layer, which contains no aerogel, is applied with a layer thickness of 0.5 cm. The further thermal insulation plaster is a purely mineral plaster based on perlite, which is obtained from a plastering mortar containing 50 to 80% by volume of perlite, 10 to 30% by volume of lime, 3 to 5% by volume of cement and 0.1% by volume of cellulose by making it up with water.

After drying of the further thermal insulation plaster layer the surface of the composite thermal insulation system is provided with a primer. Finally a surface coating based on acrylate 300 μm form of an aqueous acrylate dispersion is applied with a dry layer thickness from 200 to 300 μm. The surface coating is water-repellent and impermeable to driving rain as well as open to diffusion.

LIST OF REFERENCE SKINS

1 thermal insulation panel
2 narrow surfaces of the thermal insulation panel
3 internal structure of the thermal insulation panel
4 interstices
5 sheet material
6 composite thermal insulation system
7 building wall
8 insulation plaster system
9 bonding adhesive
10 insulation plaster layer, containing an aerogel
11 surface coating
12 primer layer
13 further insulation plaster layer
14 support layer

The invention claimed is:

1. A composite thermal insulation system, comprising a thermal insulation panel and an insulation plaster system, wherein on a surface to be insulated the thermal insulation panel is first arranged and then the insulation plaster system is subsequently arranged,
wherein the composite thermal insulation system has a thickness from 4 to 12 cm, and a thermal conductivity in a range of from 0.017 to 0.040 W/(mK),
wherein the thermal insulation panel contains at least one aerogel and is open to diffusion along its main insulation direction, the aerogel is arranged as loose bulk material in the thermal insulation panel and the thermal insulation panel has a thickness from 1 to 8 cm, and
wherein the insulation plaster system has a thickness from 1 to 5 cm, the insulation plaster system has an insulation plaster layer containing aerogel and at least one further insulation plaster layer which contains no aerogel, the insulation plaster layer containing an aerogel has a layer thickness in the range from 1.5 to 3 cm, the further insulation plaster layer containing no aerogel has a layer thickness in the range from 0.2 to 1.5 cm, and the aerogel insulation plaster layer containing an aerogel has a lime-based binding agent and a cement-based binding agent.

2. The composite thermal insulation system according to claim 1, characterized in that the insulation plaster system has a thickness from 1.5 to 4 cm.

3. The composite thermal insulation system according to claim 2, characterized in that the insulation plaster system has a thickness 2 to 3 cm.

4. The composite thermal insulation system according to claim 1, characterized by the following layer structure:
thermal insulation panel,
insulation plaster layer, containing at least one aerogel,
support layer,
further insulation plaster layer,
primer layer, and
surface coating.

5. The composite thermal insulation system according to claim 2, characterized by the following layer structure:
thermal insulation panel,
insulation plaster layer, containing at least one aerogel,
support layer,
further insulation plaster layer,
primer layer, and
surface coating.

6. The composite thermal insulation system according to claim 3, characterized by the following layer structure:
thermal insulation panel,
insulation plaster layer, containing at least one aerogel,
support layer,
further insulation plaster layer,
primer layer, and
surface coating.

* * * * *